United States Patent
Han et al.

(10) Patent No.: US 7,483,520 B2
(45) Date of Patent: Jan. 27, 2009

(54) METHOD AND APPARATUS FOR PROMPTING A CELLULAR TELEPHONE USER WITH INSTRUCTIONS

(75) Inventors: Charles Han, San Diego, CA (US); Richard Paul Walters, Dana Point, CA (US); Andrew P. DeJaco, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 542 days.

(21) Appl. No.: 09/924,310

(22) Filed: Aug. 6, 2001

(65) Prior Publication Data

US 2003/0027602 A1  Feb. 6, 2003

(51) Int. Cl.
*H04M 1/64* (2006.01)

(52) U.S. Cl. ............. 379/88.03; 379/88.19; 379/88.2; 379/88.21; 379/142.01; 379/142.06; 455/563; 704/275

(58) Field of Classification Search ............. 379/88.03, 379/88.11–88.14, 88.19–88.21, 88.23, 140, 379/142.01, 142.04–142.06, 142.09, 142.17, 379/207.15, 354–355.1, 266.07, 357.04, 379/88.01; 455/412.2, 510, 563, 466, 564, 455/404.1–404.2, 412.1, 420; 704/272, 273, 704/275, 270; 340/996; 370/352
See application file for complete search history.

(56) References Cited

U.S. PATENT DOCUMENTS

| | | | | |
|---|---|---|---|---|
| 4,994,983 A * | 2/1991 | Landell et al. | ............ | 704/245 |
| 5,398,279 A * | 3/1995 | Frain | ............ | 379/140 |
| 5,802,149 A * | 9/1998 | Hanson | ............ | 379/88.03 |
| 5,898,392 A * | 4/1999 | Bambini et al. | ............ | 340/996 |
| 5,912,949 A * | 6/1999 | Chan et al. | ............ | 379/88.03 |
| 5,978,671 A * | 11/1999 | Foladare et al. | ............ | 455/412.2 |
| 5,982,857 A * | 11/1999 | Brady | ............ | 379/88.19 |
| 6,154,526 A * | 11/2000 | Dahlke et al. | ............ | 379/88.03 |
| 6,167,117 A * | 12/2000 | Will | ............ | 379/88.03 |
| 6,351,639 B1* | 2/2002 | Motohashi | ............ | 455/420 |
| 6,356,634 B1* | 3/2002 | Noble, Jr. | ............ | 379/266.07 |
| 6,377,820 B1* | 4/2002 | Courtis et al. | ............ | 455/563 |
| 6,493,670 B1* | 12/2002 | Croft | ............ | 704/270 |
| 2002/0107049 A1* | 8/2002 | Maquaire et al. | ............ | 455/563 |
| 2002/0115476 A1* | 8/2002 | Padawer et al. | ............ | 455/564 |
| 2003/0190020 A1* | 10/2003 | Kitchings | ............ | 379/88.01 |

* cited by examiner

*Primary Examiner*—Md S Elahee
(74) *Attorney, Agent, or Firm*—Kyong H. Macek; Nicholas A. Cole; Thomas R. Rouse

(57) ABSTRACT

According to a disclosed embodiment, an incoming call from a first telephone number is received (310). A variable indicating the number of calls received from the first telephone number is incremented (312). The variable is compared to a threshold variable (316). Subsequently, the user is prompted to save the first telephone number in an address book (319) when the variable indicating the number of times an incoming call is received from the first telephone number is equal to, or greater than, the threshold variable. The first telephone number is then stored in the address book. Moreover, an apparatus can be assembled (200) to provide cellular telephone users with, for example, instructions and information via a speaker (228) and an LCD display (238). The apparatus is configured to provide instructions and information to the cellular telephone user at appropriate times, thereby increasing the cellular telephone's usefulness.

32 Claims, 6 Drawing Sheets

METHOD AND APPARATUS FOR PROMPTING A CELLULAR TELEPHONE USER WITH INSTRUCTIONS

BACKGROUND

1. Field

The disclosed embodiments relate generally to wireless communication systems, and more specifically to audio prompting and guiding users of cellular telephones.

2. Background

Mobile cellular telephone ("cellular telephone") use has increased dramatically in recent years. Many cellular telephones now offer a wide array of features designed to enhance their performance. For example, most cellular telephones have the ability to store telephone numbers which the cellular telephone user ("caller") can recall by accessing the unit's "phone book" or "address book". Another feature found widely in cellular telephones is the ability to track the cellular telephone's call history, e.g. recalling the last ten numbers called on the cellular telephone. Many cellular telephones also offer the caller a "speed dialing" option which lets the caller "dial" certain telephone numbers, for instance numbers that the caller calls most frequently, by pressing fewer keys than the seven or more required normally. In even more advanced cellular telephones having voice dialing capabilities, the caller can request connection to a particular telephone number by simply speaking the receiving party's name into the cellular telephone's microphone. When implemented properly, features such as those described above can increase the cellular telephone's usefulness.

Unfortunately, with increasingly more features, cellular telephones become accordingly more complicated to operate, resulting in many cellular telephone users not enjoying the full range of features offered by their cellular telephone. The cellular telephone user is oftentimes not even aware of all the features available. Hence, cellular telephones are now sold with a thick instruction manual to provide buyers with all the information and instructions required for optimal operation of the cellular telephones. To be able to take full advantage of the cellular telephone's many features, a cellular telephone user has to wade through the pages of the manual, read the often confusing technical language, and apply the written instructions. This task can be tedious and time-consuming and inhibits the cellular telephone user from implementing features which would make the cellular telephone more useful. Moreover, the cellular telephone user has to keep track of the manual's whereabouts in order to implement or learn about a certain feature at a later date.

Some cellular telephone manufacturers have gone beyond providing their customers with only an instructions manual and are now also providing instructions on the cellular telephone's display screen. For example, a typical cellular telephone may have certain keys which the caller can press to receive instructions on how to implement a certain feature. The instructions are then presented as text on the cellular telephone's display screen to be read by the caller. Correct implementation of the feature may involve a series of steps presented sequentially on screen after screen of text. Unfortunately, on most cellular telephones, the display screen is necessarily small to conform to the cellular telephone's compactness and is therefore not conducive to the displaying of text. The frustration of having to read screen after screen of text inhibits many cellular telephone users from taking full advantage of the features available on their cellular telephone. Thus, utilizing the cellular telephone's display screen has not proven to be an effective means by which to convey information to the cellular telephone user.

There is thus a need in the art for cellular telephones that provide users at appropriate times with instructions and information to use their cellular telephones without having to consult an instruction manual. There is also a need in the art for cellular telephones that do not require users to read all the instructions and information from the cellular telephone's display screen.

SUMMARY

Embodiments disclosed herein address the above stated needs by providing cellular telephone users with instructions and information at appropriate times to make cellular telephones more useful. More specifically, the information and instructions are presented to the cellular telephone user audibly through the cellular telephone's speaker in conjunction with the displaying of text on the cellular telephone's LCD screen.

In one aspect of the invention, an incoming call from a first telephone number is received. A variable indicating the number of calls received from the first telephone number is incremented. In other words, the variable is utilized to track the number of times an incoming call is received from the first telephone number. The variable can be set, for example, by the manufacturer or by the cellular telephone user. Subsequently, the user is prompted, for example, to save the first telephone number in an address book when the variable indicating the number of times an incoming call is received from the first telephone number is equal to, or greater than, a threshold number. The first telephone number is then stored in the address book.

In another aspect, an apparatus can be assembled to provide cellular telephone users with, for example, instructions and information via a speaker and an LCD display. The apparatus is configured to provide instructions and information to the cellular telephone user at appropriate times, thereby increasing the cellular telephone's usefulness.

DETAILED DESCRIPTION

The present invention is directed to method and apparatus for prompting a cellular telephone user with instructions. Although the invention is described with respect to specific embodiments, the principles of the invention, as defined by the claims appended herein, can obviously be applied beyond the embodiments of the description described specifically herein. Moreover, certain details have been left out in order to not obscure the inventive aspects of the invention. The specific details not described in the present application are within the knowledge of a person of ordinary skill in the art.

The drawings in the present application and their accompanying detailed description are directed to merely example embodiments of the invention. To maintain brevity, other embodiments of the invention that use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 1:
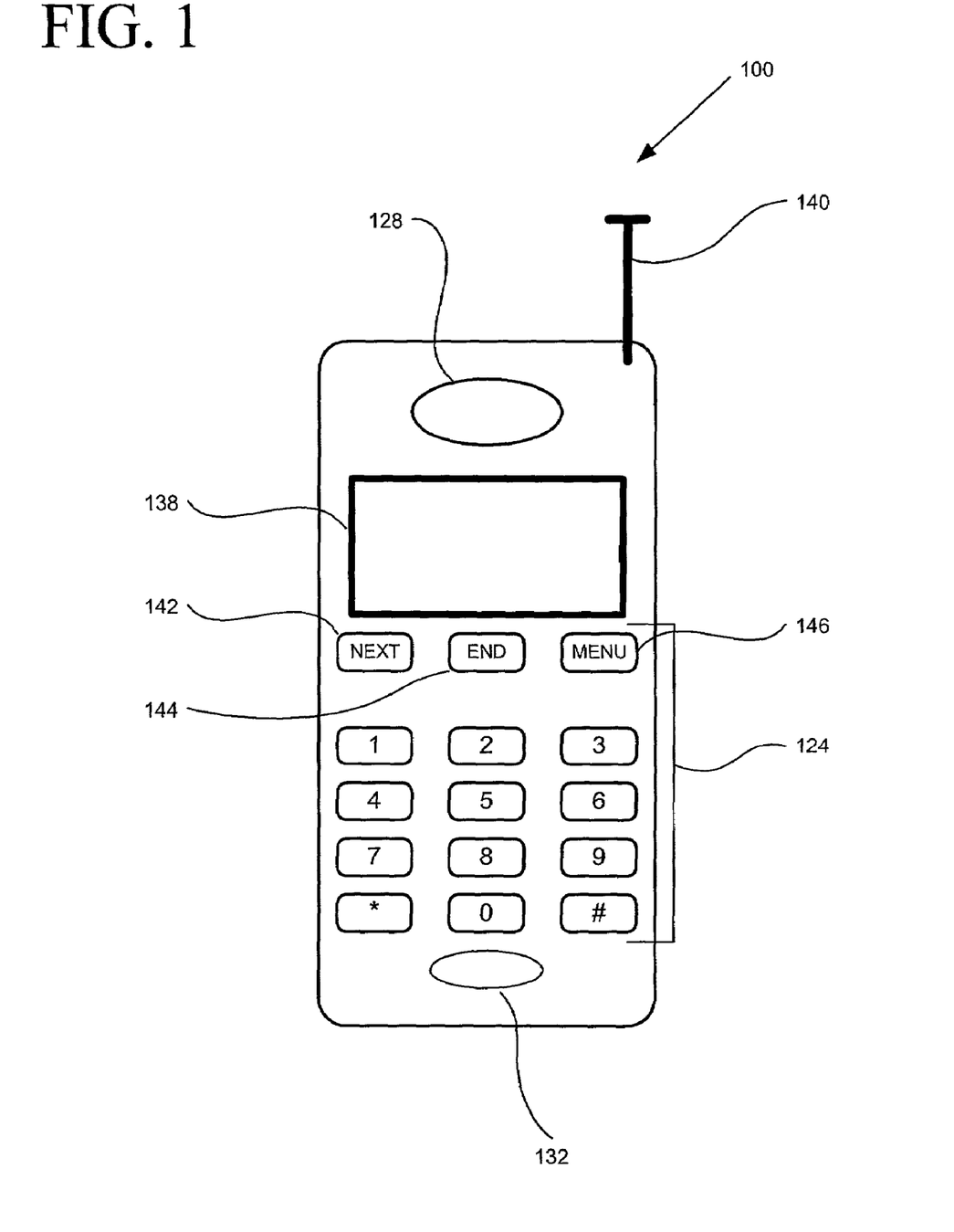
FIG. 1 shows an exemplary mobile cellular telephone used to illustrate example implementations of the invention.

Referring now to FIG. 1, exemplary mobile cellular telephone ("cellular telephone") 100 is used to illustrate example implementations of the invention in a wireless communication system. A mobile cellular telephone is also referred to as a "mobile unit" in the present application. Exemplary cellular telephone 100 has telephone keypad ("keypad") 124, speaker ("earpiece") 128, LCD display 138, antenna 140, and microphone ("mouthpiece") 132. By directing incoming and outgoing signals, antenna 140 provides communication between the mobile unit and, for example, a base station in the wireless communication system. Input devices such as telephone keypad 124 and microphone 132 are the means by which the cellular telephone user inputs information to the cellular telephone. Output devices such as speaker 128 and LCD display 138 are used to present information to the cellular telephone user. The cellular telephone user is also referred to as the "user" or "caller" in the present application (the cellular telephone user is not shown in any figures of the present application). Further, exemplary cellular telephone 100 in FIG. 1 has so-called "soft keys" which can have different functions depending on the mode of the cellular telephone. The soft keys found on cellular telephone 100 include NEXT key 142, END key 144, and MENU key 146. These three soft keys are part of telephone keypad 124. Thus, FIG. 1 shows an exemplary cellular phone used to illustrate certain implementations of the invention.

Figure 2:
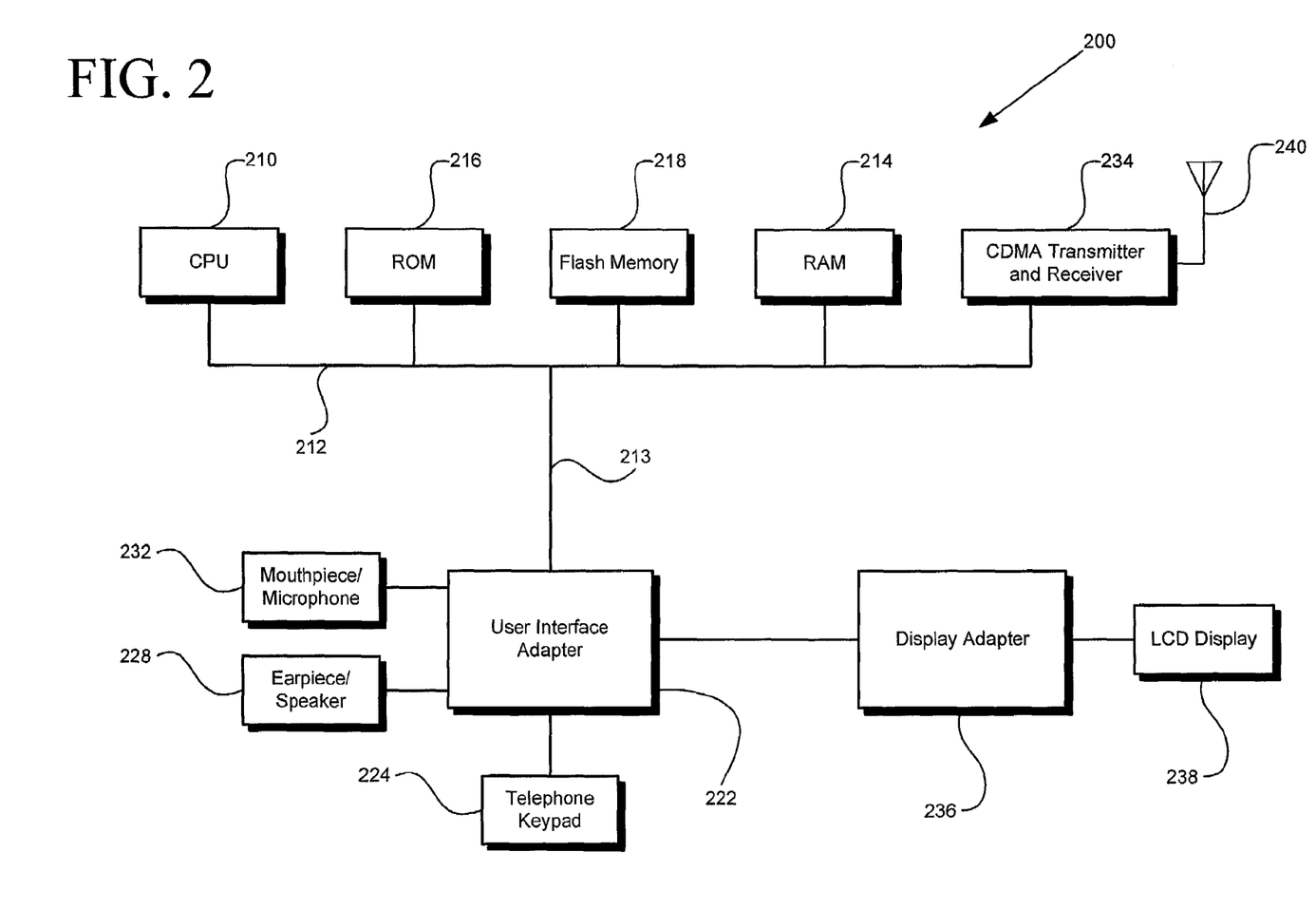
FIG. 2 is a system block diagram illustrating an exemplary hardware environment for practicing the invention in the context of a mobile cellular telephone such as exemplary cellular telephone 100 shown in FIG. 1.

In FIG. 2, an exemplary hardware environment is illustrated for practicing the embodiments of the present invention in the context of a cellular telephone such as exemplary cellular telephone 100 shown in FIG. 1. FIG. 2 shows an exemplary block diagram of a hardware environment comprising various features and components commonly found in cellular telephones. Hardware environment 200 in FIG. 2 includes features and components which are analogous in form and function to corresponding features and components of cellular telephone 100 in FIG. 1. The corresponding features and components are numbered in a manner consistent with FIG. 1. In particular, telephone keypad 124, speaker 128, microphone 132, LCD display 138, and antenna 140 of cellular telephone 100 in FIG. 1 are shown, respectively, as telephone keypad 224, speaker 228, microphone 232, LCD display 238, and antenna 240 in hardware environment 200 of FIG. 2.

Hardware environment 200 also includes central processing unit ("CPU") 210, read only memory module ("ROM") 216, random access memory module ("RAM") 214, flash memory module 218, CDMA transmitter and receiver 234, cellular telephone user interface ("UI") adapter 222, and display adapter 236. CDMA transmitter and receiver 234 is configured to receive and transmit calls. As shown in FIG. 2, bus 212 couples CPU 210, ROM 216, RAM 214, flash memory module 218, and CDMA transmitter and receiver 234. User interface adapter 222 is connected to CPU 210 by bus 212 and connection 213. User interface adapter 222 drives display adapter 236 and thereby causes LCD display 238 to operate. User interface adapter 222 also drives speaker 228, microphone 232, and keypad 224. Thus, FIG. 2 shows an exemplary hardware environment for practicing the embodiments of the present invention in the context of a mobile cellular telephone.

In the context of exemplary cellular telephone 100 which includes exemplary hardware environment 200, the invention increases the usefulness of a cellular telephone by providing cellular telephone users with information and instructions at appropriate times. The information can teach the user, for example, how certain features can be executed, to the availability of certain features, or to how the user can utilize a feature better. The information can be taught via LCD display 138, speaker 128, or a combination of both whenever it is determined that the cellular telephone user needs such information to increase the cellular telephone's usefulness. The information is presented as a text prompt when provided via LCD display 138 and is presented as an audible prompt when provided via speaker 128.

Using hardware environment 200 for illustrative purposes, information directed to helping users increase the usefulness of their cellular telephones can be saved in a non-volatile memory module such as flash memory module 218. The information may be included to inform the user that the cellular telephone has certain features of which the users may be unaware. For example, the information can notify the user about the speed dialing feature when it is determined that the user has requested connection to a telephone number repeatedly without utilizing the speed dialing feature. After being notified of the feature, the user would be further provided with instructions for executing the feature. The information would be presented audibly via speaker 228 for the user to hear or textually via LCD display 238 for the user to read. The user's response to the information and instructions is received via telephone keypad 224 or microphone 232 when the user inputs data via telephone keypad 224 or microphone 232.

FIGS. 3A, 3B, 3C, and 3D illustrate example implementations of providing information to a cellular telephone user at appropriate times in the context of exemplary cellular telephone 100 in FIG. 1 and exemplary hardware environment 200 shown in FIG. 2. Although the following descriptions point to certain particular embodiments of the invention, it will be readily apparent to a person of ordinary skill in the art how to implement the invention in similar situations and applications where prompting a cellular telephone user with information and instructions at appropriate times increases the usefulness of a device such as the cellular telephone.

Figure 3A:
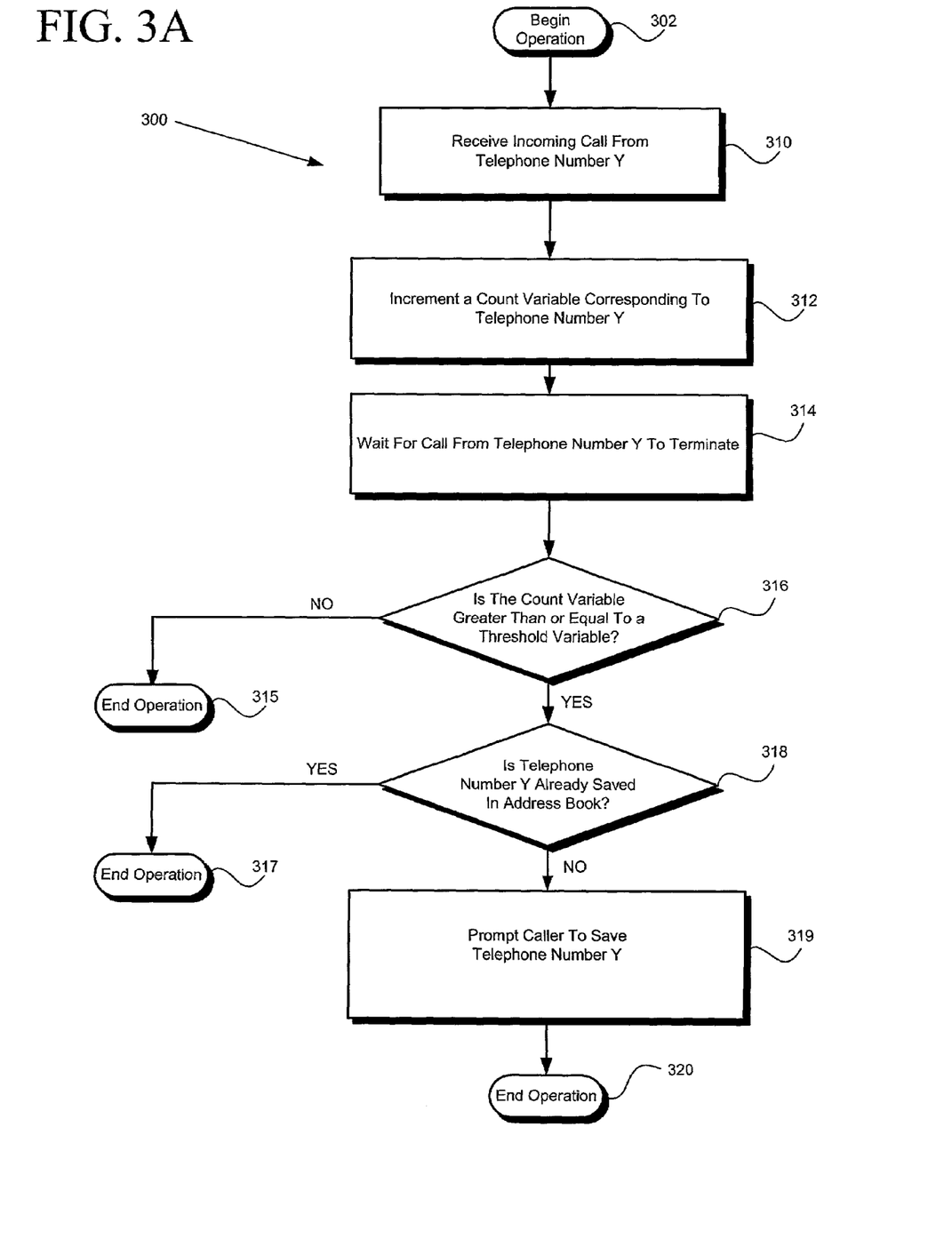
FIG. 3A is a flowchart for an operation of prompting for saving a given telephone number in accordance with one embodiment of the invention.

FIG. 3A illustrates a flowchart for an operation of prompting for saving a given telephone number in accordance with one embodiment. The operation of prompting for saving a given telephone number can be used to prompt the caller at appropriate times to utilize the cellular telephone's number saving feature, also referred to as "address book feature". It is noted that prompting is also referred to as "asking" or "requesting" in the present application. The feature of saving a given telephone number allows the caller to save telephone numbers in an address book in the cellular telephone's non-volatile memory module. Using exemplary hardware environment 200 of FIG. 2 for illustrative purposes, the telephone numbers can be saved, for example, in an address book in flash memory module 218. Saving telephone numbers in flash memory module 218 can make it possible, for example, for the telephone numbers to be modified or deleted later if the caller so desires. The number saving feature allows the caller at a later time to recall the telephone numbers saved in the address book.

Continuing with FIG. 3A, the invention's operation of prompting for saving a given telephone number begins at step 302, as shown in flowchart 300. The operation continues at step 310 when the cellular telephone receives an incoming call from telephone number "Y." It is noted that "Y" is a shorthand reference to a full seven or ten digit telephone number, or a telephone number of any other length, in the present application. Upon receiving the call, telephone number Y is saved in, for example, a volatile memory module such as RAM 214 for further processing.

At step 312, a counter increments a count variable corresponding to the telephone number Y for each successive time an incoming call is received from telephone number Y. The count variable can be stored in the cellular telephone's non-volatile memory module such as flash memory module 218. The reason that the count variable is stored in flash memory module 218 as opposed to RAM 214 is that, according to the present embodiment, the count variable must remain "memorized" in the cellular telephone even while the telephone is turned off.

At step 314, the cellular telephone waits for the call to terminate. Connection to telephone number Y is terminated when, for example, END key 144 shown in FIG. 1 is entered. At step 316 of flowchart 300, the count variable is compared to a threshold variable. The count variable, also referred to as a variable in the present application, is compared to the threshold variable to determine whether a sufficient number of calls from telephone number Y have been received so as to require a prompting of the caller to save telephone number Y in the cellular telephone's address book. The value of the threshold variable may be predefined by the cellular telephone manufacturer or is alternatively set by the cellular telephone user based on the user's preference. The threshold variable can be saved in flash memory module 218. In the present example, the threshold variable is set at three. If it is determined at step 316 of flowchart 300 that the count variable is less than the threshold variable, i.e. the count variable is less than three in the present example, the caller is not prompted to store telephone number Y in the cellular telephone's address book. The operation of the present embodiment of the invention in prompting the caller for saving a given telephone number would end at step 315 under such a condition.

On the other hand, if it is determined at step 316 of flowchart 300 that the count variable is equal to, or greater than, the threshold variable, then the address book containing any previously saved telephone numbers is reviewed at step 318. The address book is reviewed at step 318 to determine whether telephone number Y is already saved in the address book. If telephone number Y is already saved in the address book, it would be unnecessary to prompt the caller to save telephone number Y, and the operation of the present embodiment of the invention in prompting the caller for saving a given telephone number would end at step 317 under such a condition.

If it is determined at step 318 that telephone number Y is not in the cellular telephone's address book then the operation of prompting the caller for saving a given telephone number continues at step 319. According to the present embodiment of the invention, at step 319 an audio prompt is audibly played back via speaker 228 to prompt the caller to save telephone number Y in the address book. For example, the prompt may say, "Would you like to save this number in your address book?" Manifestly, the caller can be similarly prompted textually via LCD display 238. The operation of prompting the caller for saving a given telephone number would then end at step 320. If the caller wishes to save telephone number Y in the address book, further instructions, which are not shown in flowchart 300, can be provided via speaker 228 and/or LCD display 238 to guide the caller through the process.

By prompting the caller at an appropriate time to save a telephone number in the cellular telephone's address book, the invention increases the cellular telephone's usefulness. And although flowchart 300 is directed to prompting a caller to save a telephone number of an incoming call, a person of ordinary skill in the art would recognize how the invention can be implemented to prompt a caller to save the telephone number of an outgoing call. Being able to save telephone numbers directly in the cellular telephone's address book is beneficial because it permits the caller to have quick and easy access to necessary telephone numbers without having to carry a phone book. The present embodiment increases a cellular telephone's usefulness by encouraging the cellular telephone owner to use the cellular telephone's number saving feature. Thus, FIG. 3A illustrates a flowchart describing the operation for prompting the caller for saving a given telephone number in accordance with one embodiment.

Figure 3B:
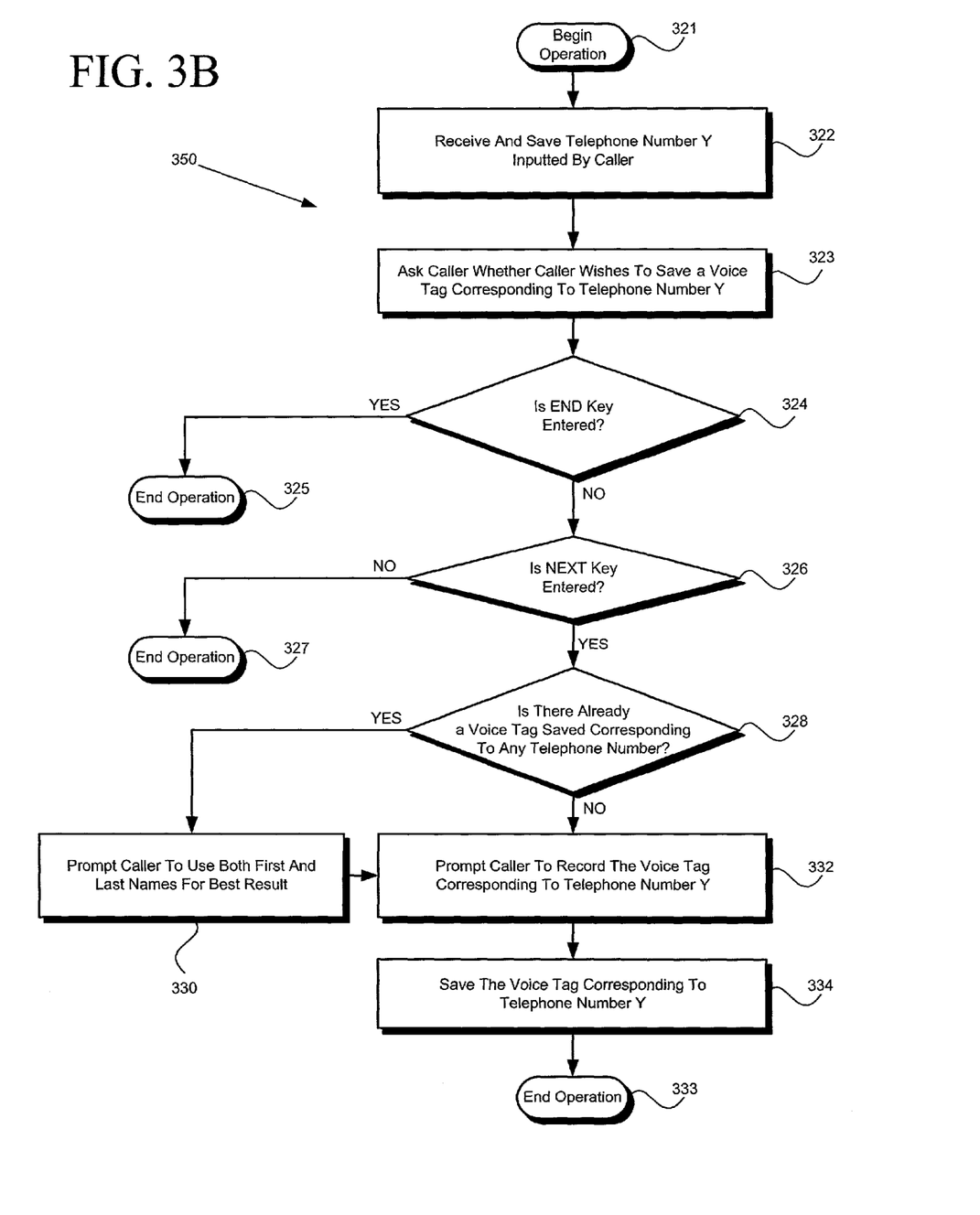
FIG. 3B is a flowchart for an operation of prompting for saving a voice tag corresponding to a given telephone number in accordance with one embodiment of the invention.

FIG. 3B illustrates a flowchart for an operation of prompting for voice tag recording in accordance with one embodiment. The operation of prompting for voice tag recording provides prompts at appropriate times to help the caller record a voice tag in order to subsequently "dial" a number utilizing the cellular telephone's voice dialing feature. The voice tag is the utterance made by the caller which is recorded by the cellular telephone's microphone, saved in a voice tag file in the cellular telephone's non-volatile memory module, and matched to a particular telephone number saved in the cellular telephone's address book. The voice tag can be, for example, a name that identifies the party matched to the particular telephone number. After the voice tag is saved, the caller can utilize the voice dialing feature by speaking the voice tag into the cellular telephone's microphone, and the cellular telephone connects the caller to the telephone number matched to the voice tag.

As an example, if a caller saves telephone number Y in the cellular telephone's address book and wants to be able to request connection to telephone number Y utilizing the cellular telephone's voice dialing feature, the caller would record a voice tag corresponding to telephone number Y. To record the voice tag, the caller would speak a name which is received by the cellular telephone's microphone. In the context of hardware environment 200 in FIG. 2, microphone 232 could be used to receive the voice tag. The name spoken by the caller would then be saved as a voice tag in a voice tag file in flash memory module 218. The voice tag file contains recordings of voice tags corresponding to different telephone numbers. After the voice tag has been saved in the voice tag file, the caller can request connection to telephone number Y by vocalizing the voice tag into the cellular telephone's microphone, rather than having to enter the seven or more digits on the cellular telephone's keypad as is ordinarily required.

Continuing with FIG. 3B, flowchart 350 illustrates an operation of prompting for saving a voice tag corresponding to a given telephone number beginning at step 321. Again, using telephone number Y for illustrative purposes, the operation continues at step 322 where telephone number Y is received and saved in an address book in the cellular telephone's flash memory module 218. Telephone number Y can be received via keypad 224 when the caller inputs the digits of telephone number Y by pressing the keys corresponding to telephone number Y.

After telephone number Y has been received and saved, the caller is prompted at step 323 whether the caller wishes to save a voice tag corresponding to telephone number Y. The caller can be prompted textually via LCD display 238. Alternatively, an audio prompt asking the caller whether to save a voice tag can be played back through speaker 228. The audio prompt can say, for example, "Press NEXT key to save voice tag, press END key to exit." Thus, at step 324, the caller is given the option of whether to save a voice tag corresponding to telephone number Y by inputting either END key 144 or NEXT key 142 shown in FIG. 1.

At step 324, it is detected whether END key 144 is entered. If END key 144 is entered, it indicates that the caller does not want to save a voice tag corresponding to telephone number Y at this point. The operation of prompting for saving a voice tag corresponding to a given telephone number would end at step 325. If the END key 144 is not entered at step 324, the operation of prompting for voice tag recording would continue.

At step 326, it is detected whether NEXT key 142 is entered. If NEXT key 142 is entered, it indicates that the caller does want to save a voice tag corresponding to telephone number Y. Under such a scenario, the operation of prompting for voice tag recording would continue. Conversely, if NEXT key 142 is not entered at step 326, the operation of prompting for voice tag recording would end at step 327.

At step 328, it is detected whether a voice tag has already been successfully saved corresponding to any telephone number. For instance, the caller may have successfully saved a voice tag for a different telephone number. Whether any voice tag has been successfully saved for any telephone number can be determined by reviewing the voice tag file stored in flash memory module 218. The presence of a voice tag successfully saved previously would indicate that the caller has had some experience with saving a voice tag and would therefore require less assistance to save a voice tag for telephone number Y. Conversely, if a review of the voice tag file determines that no voice tag has been successfully saved previously, the caller is less likely to be familiar with the process of recording a voice tag and would therefore require more information on how to record successfully.

If it is determined at step 328 that no voice tag has been saved previously, the caller is prompted at step 330 to speak in a manner that improves the quality of the voice tag recording. For example, an audio prompt played back via speaker 232 may say, "Use both first and last names for best result." Because no voice tag has been successfully saved previously, this audio prompt provides guidance to the caller as to how the caller may want to speak the name of the person corresponding to telephone number Y for effective recording of the voice tag.

On the other hand, if it is determined at step 328 that at least one voice tag has already been successfully saved in the voice tag file, the indication would be that the caller has some familiarity with the process of recording a voice tag. It would therefore be unnecessary to suggest to the caller, for example, that both first and last names should be used for best result. Under this condition, the operation of prompting for saving a voice tag corresponding to a given telephone number would end at step 332.

At step 332, an audio prompt can be audibly played back through speaker 228 asking the caller to utter the voice tag. The audio prompt may say, for example, "Name, please." It is noted that the prompt could also be presented via LCD display 238. The prompt is an invitation for the caller to record a name to match the number the caller has just saved.

The vocalization of the voice tag by the caller is recorded at step 334 by microphone 232. The voice tag can then be saved, for example, in the voice tag file in flash memory module 218. The operation of prompting for saving a voice tag corresponding to a given telephone number would then end at step 333.

By prompting the cellular telephone user through the process of saving a voice tag to match a previously saved telephone number, the invention increases the likelihood that the user will utilize the voice dialing feature. The invention also enhances the effectiveness of voice dialing by prompting the user to record in a more effective manner. The invention thereby increases the cellular telephone's usefulness. Thus, FIG. 3B illustrates a flowchart describing the operation of prompting for saving a voice tag corresponding to a given telephone number in accordance with one embodiment.

Figure 3C:
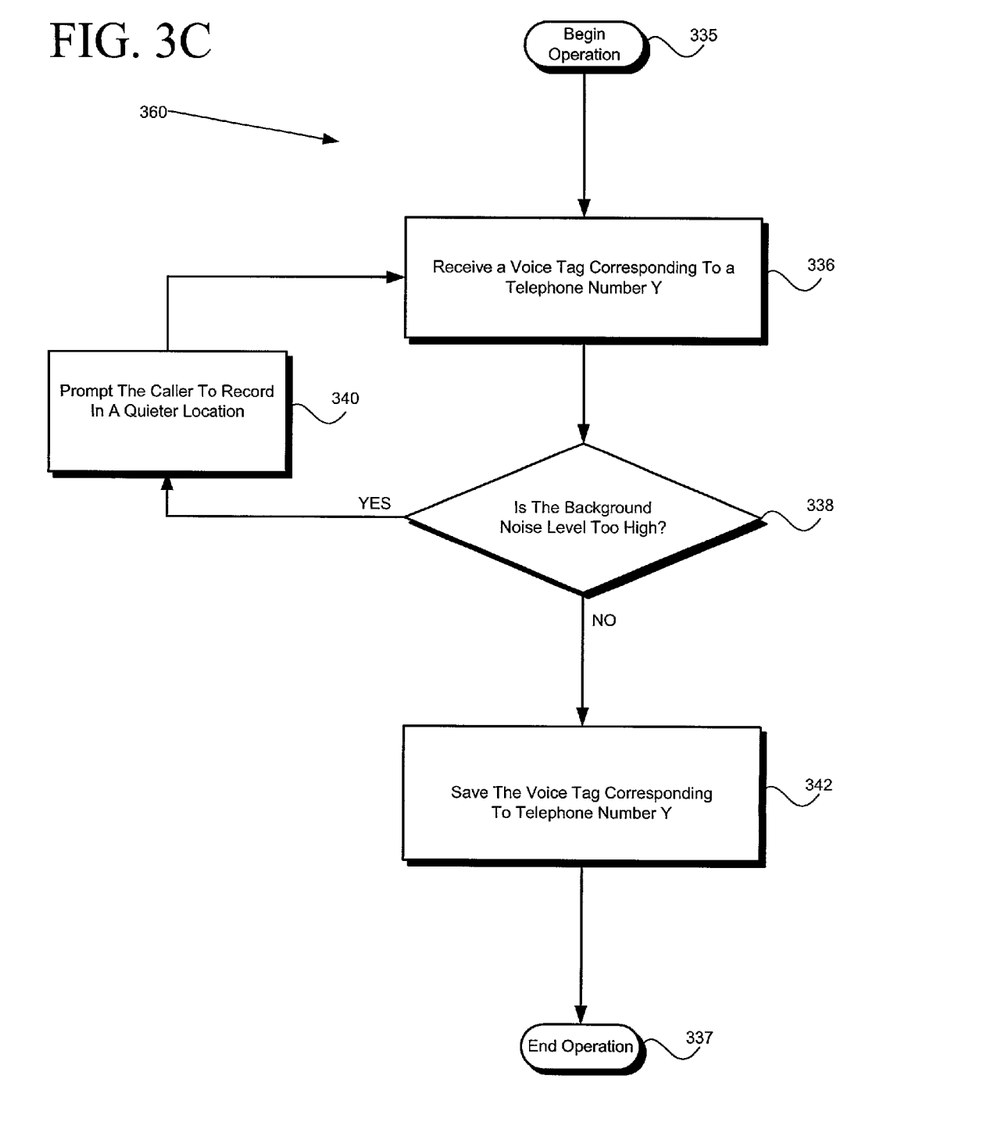
FIG. 3C is a flowchart for an operation of prompting for improving voice tag recording quality in accordance with one embodiment of the invention.

FIG. 3C illustrates a flowchart for an operation of prompting for improving voice tag recording quality in accordance with one embodiment. The operation of prompting for improving voice tag recording quality provides a prompt at an appropriate time during the voice tag recording process to help the caller record a higher quality voice tag. The recording quality of the voice tag is important because it determines how effectively the cellular telephone's voice dialing feature "recognizes" the voice tag in order to connect to the telephone number corresponding to the voice tag. For example, when the caller has saved a voice tag in the voice tag file corresponding to telephone number Y in the address book, the recording quality of the voice tag determines how effectively the cellular telephone processes a request for connection to telephone number Y when the caller makes a request for connection to telephone number Y utilizing the voice dialing feature. A higher quality recording of the voice tag increases the likelihood that the cellular telephone will match the voice tag to telephone number Y and connect properly to telephone number Y.

Continuing with FIG. 3C, the invention's operation of prompting for improving voice tag recording quality begins at step 335 as shown in flowchart 360. The operation continues at step 336 where an initial rendition of a voice tag corresponding to telephone number Y is received. Using exemplary hardware environment 200 for illustrative purposes, the voice tag is received via microphone 232. This initial rendition of the voice tag is saved in the cellular telephone's volatile memory module, such as RAM 214, for further analysis. In the present embodiment of the invention, the voice tag is saved temporarily in RAM 214 until it is determined that the voice tag's recording quality is adequate.

At step 338 the recording quality of the voice tag is analyzed to determine whether the recording satisfies a quality parameter. A quality parameter can be defined for different quality indicators important to voice tag recording quality. A quality parameter can be set, for example, for the background noise level. Using the quality parameter for background noise level as an example, at step 338, the voice tag is analyzed to determine whether the voice tag has an unacceptably high background noise level. A high background noise level can result from the caller recording the voice tag in a noisy surrounding, producing a poor recording. If an unacceptably high background noise level is detected when comparing the recording quality of the voice tag with the quality parameter such that the quality parameter is not satisfied, the caller would be prompted at step 340 to try re-recording the voice tag in a new location, preferably a location that is less noisy. As an example, an audio prompt can be played back via speaker 228 at step 340 prompting the caller to, "Avoid recording in a noisy place." Likewise, the prompt can be presented as text on LCD display 238. After this prompt is presented, the caller is returned to step 336 above where the caller can re-record the voice tag.

However, if the recording quality of the voice tag satisfies the quality parameter defined for background noise level at step 338, the voice tag would then be saved in the voice tag file in flash memory module 218 at step 342. The voice tag would be saved in such a way that the caller could in the future request connection to telephone number Y by using the cellular telephone's voice dialing feature. In other words, the voice tag would be saved to correspond to telephone number Y. The operation of prompting for improving voice tag recording quality would then end at step 337.

The present embodiment of the invention makes the cellular telephone's voice dialing feature function more effectively because it monitors the recording quality of a voice tag and provides the cellular telephone user with information and guidance at appropriate times to improve the recording quality. And in making the voice dialing feature function more effectively, the invention increases the usefulness of cellular telephones. Thus, FIG. 3C illustrates a flowchart describing the operation of prompting for improved voice tag recording in accordance with one embodiment.

Figure 3D:
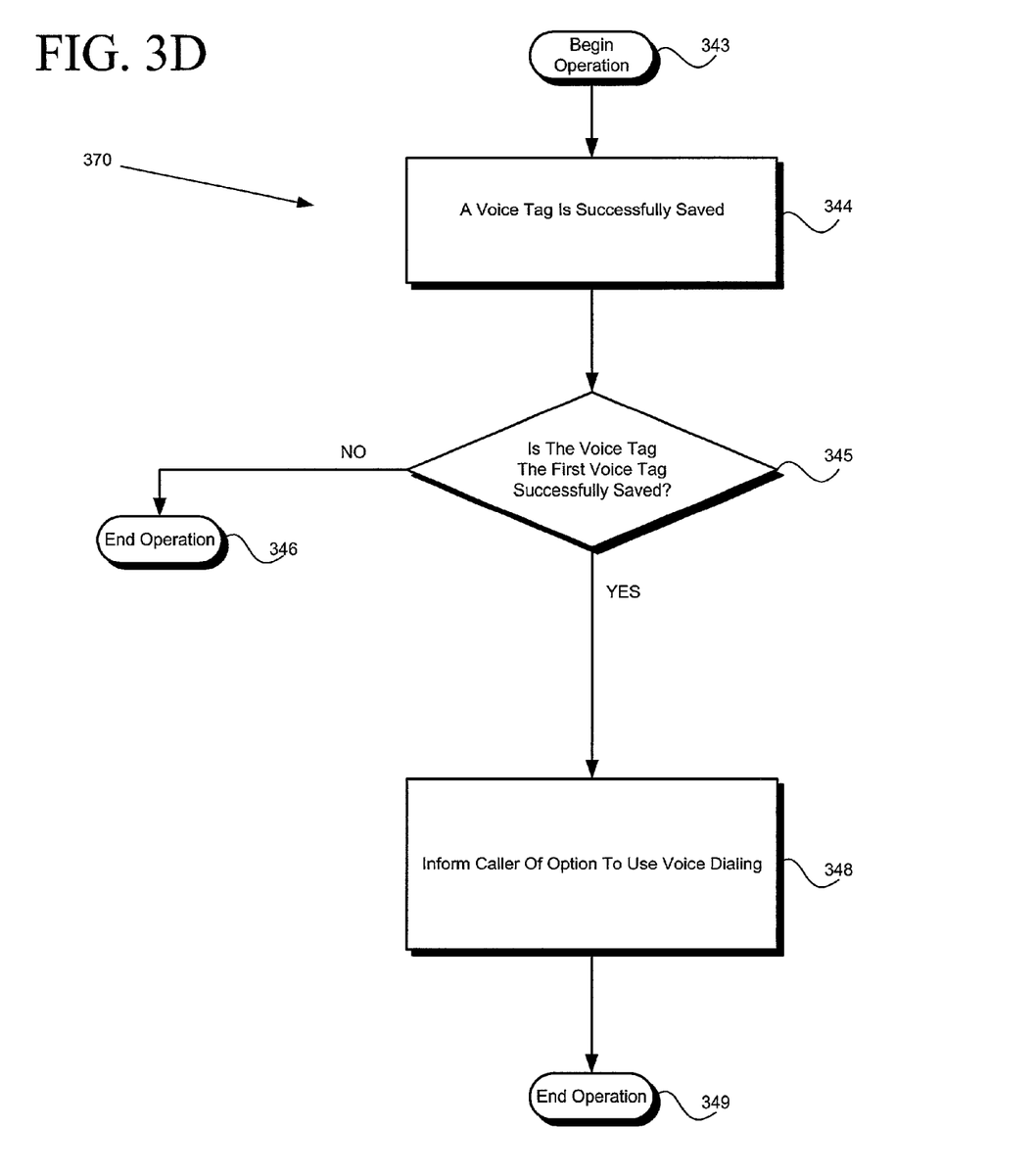
FIG. 3D is a flowchart for an operation of prompting for using voice dialing in accordance with one embodiment of the invention.

FIG. 3D illustrates a flowchart for an operation of prompting for using voice dialing in accordance with one embodiment. The operation of prompting for using voice dialing provides a prompt at an appropriate time to notify the caller of an opportunity to utilize the cellular telephone's voice dialing feature. Continuing with FIG. 3D, the operation of prompting for using voice dialing begins at step 343, as shown in flowchart 370. The operation continues at step 344 where a voice tag corresponding to a telephone number (telephone number Y in the present example) is successfully saved in a voice tag file. Using hardware environment 200 for illustrative purposes, the voice tag can be saved in a voice tag file in flash memory module 218. The voice tag is saved in such a way that the caller can utilize the cellular telephone's voice dialing feature to request connection to corresponding telephone number Y saved in the address book.

At step 345, the voice tag file is reviewed to determine whether the voice tag is the first voice tag to be saved successfully. If other voice tags have been successfully saved previously, the caller is presumed to have experience with the voice dialing feature. Under such a condition, it would be unnecessary to prompt the caller of the option to use the voice dialing feature, and the operation of prompting for using voice dialing would end at step 346.

If it is instead determined at step 345 that the voice tag is the first voice tag to be saved successfully in the voice tag file, a prompt can be presented at step 348 informing the caller that the cellular telephone has a voice dialing feature which the caller can utilize. For example, an audio prompt can be played back at step 348 through speaker 228, asking the caller to press a certain key on the cellular telephone's keypad to utilize the voice dialing feature. For instance, the caller may be instructed to press NEXT key 242 to use voice dialing. The audio prompt may say, for example, "To use voice dialing, press the NEXT key." It is noted that the prompt can also be presented textually via LCD display 238. The operation of prompting for using voice dialing would then end at step 349.

By prompting the caller at an appropriate time to use the cellular telephone's voice dialing feature, the present embodiment of the invention increases the likelihood that the voice dialing feature is utilized by the caller and increases the cellular telephone's usefulness. Thus, FIG. 3D illustrates a flowchart describing the operation of prompting for using voice dialing in accordance with one embodiment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an Application Specific Integrated Circuit ("ASIC"). The ASIC may reside in a cellular telephone. In the alternative, the processor and the storage medium may reside as discrete components in the cellular telephone.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method performed by a wireless communication device comprising steps of:
receiving an incoming call from a first telephone number, wherein the incoming call is received by the wireless communication device;
incrementing a variable indicating a number of calls received by the wireless communication device from said first telephone number;
prompting a user of the wireless communication device with a first prompt to save said first telephone number when said variable is equal to or greater than a threshold number;
checking whether a first voice tag corresponding to any telephone number has already been saved within the wireless communication device;
providing the user with guidance when said first voice tag corresponding to any telephone number has not already been saved;
prompting the user with a second prompt for a second voice tag corresponding to said first telephone number when said first voice tag corresponding to any telephone number has already been saved;
prompting the user with a third prompt for a new voice tag if a recoding quality of the corresponding voice tag does not satisfy a quality parameter; and
storing said first telephone number and an acceptable recording quality voice tag within the wireless communication device.

2. The method of claim 1 wherein said prompting steps comprise audibly prompting said user.

3. The method of claim 1 wherein said prompting steps comprise presenting text on an LCD display.

4. The method of claim 1 wherein said threshold number is set by a manufacturer.

5. The method of claim 1 wherein said threshold number is set by said user.

6. The method of claim 1 further comprising a step of saving said voice tag corresponding to said first telephone number in a voice tag file.

7. The method of claim 1 further comprising a step of comparing said corresponding voice tag to a quality parameter in order to determine whether the recording quality of the corresponding voice tag satisfies said quality parameter.

8. The method of claim 7 further comprising a step of making a request to said user to record said new voice tag in a different geographical location.

9. The method of claim 8 wherein said step of making said request comprises making said request audibly.

10. The method of claim 8 wherein said making step comprises presenting text on an LCD display.

11. The method of claim 7 further comprising a step of saving said voice tag corresponding to said first telephone number in a voice tag file.

12. An apparatus in a wireless communication device comprising:
a receiver in the wireless communication device configured to receive an incoming call from a first telephone number;
a CPU in the wireless communication device configured to increment a variable indicating a number of calls received by the wireless communication device from said first telephone number;
a user interface adapter in the wireless communication device configured:
to prompt a user to save said first telephone number when said variable is greater than a threshold number;
to prompt the user to save a second voice tag corresponding to said first telephone number when a first voice tag corresponding to any telephone number has already been saved;
to prompt the user with a prompt for providing guidance when said first voice tag corresponding to any telephone number has not already been saved; and
to prompt the user for a new third voice tag if a recording quality of the second voice tag corresponding to said first telephone number does not satisfy a quality parameter; and
a memory module configured to store said first telephone number and an acceptable recording quality voice tag.

13. The apparatus of claim 12 wherein said user interface adapter causes a speaker to prompt said user to save said first telephone number.

14. The apparatus of claim 12 wherein said user interface adapter causes an LCD display to prompt said user to save said first telephone number.

15. The apparatus of claim 12 wherein said threshold number is set by a manufacturer.

16. The apparatus of claim 12 wherein said threshold number is set by said user.

17. The apparatus of claim 12 wherein said CPU is further configured to compare said corresponding voice tag to a quality parameter in order to determine whether the recording quality of the corresponding voice tag satisfies said quality parameter.

18. The apparatus of claim 17 wherein said user interface adapter is further configured to prompt said user to record said voice tag in a new geographical location.

19. A method performed by a wireless communication device, comprising steps of:
receiving a voice tag corresponding to a first telephone number, said voice tag having a recoding quality, wherein the wireless communication device receives the voice tag;
comparing said recording quality to a quality parameter stored at the wireless communication device;
prompting a user of the wireless communication device to re-record said voice tag when said recording quality does not satisfy said quality parameter;
saving said voice tag at the wireless communication device;
checking whether said voice tag is a first voice tag to be saved at the wireless communication device, wherein said checking is performed by the wireless communication device; and
informing said user of an option to use voice dialing if said voice tag is the first voice tag to be saved.

20. The method of claim 19 wherein said prompting step comprises prompting said user audibly.

21. The method of claim 19 wherein said prompting step comprises presenting text on said LCD display.

22. The method of claim 19 further comprising a step of saving said first telephone number before said step of receiving.

23. The method of claim 19 further comprising a step of asking said user to utilize a voice dialing feature.

24. The method of claim 23 wherein said asking step comprises audibly asking said user.

25. The method of claim 23 wherein said asking step comprises presenting text on an LCD display.

26. A method performed by a wireless communication device, comprising steps of:

checking whether a first voice tag corresponding to any telephone number has already been saved at the wireless communication device, wherein said checking is performed by the wireless communication device;

providing a user of the wireless communication device with a first prompt for guidance when said first voice tag has not already been saved at the wireless communication device; and prompting the user with a second prompt for a second voice tag corresponding to a first telephone number when said first voice tag has already been saved at the wireless communication device.

27. The method of claim 26 further comprising the step of:

receiving and saving, before said checking step, said first telephone number input by the user.

28. The method of claim 26 further comprising steps of:

prompting the user with a third prompt for a new voice tag if a recording quality of said second voice tag does not satisfy a quality parameter; and storing said first telephone number and an acceptable recording quality voice tag.

29. A method performed by a wireless communication device, comprising steps of:

checking whether a new voice tag is a first voice tag to be successfully saved at the wireless communication device, wherein said checking is performed by the wireless communication device; and informing a user of the wireless communication device of an option to user voice dialing if said new voice tag is the first voice tag to be successfully saved at the wireless communication device.

30. The method of claim 29 further comprising the step of:

successfully saving, before said checking step, said new voice tag.

31. The method of claim 29 further comprising the step of:

ending an operation of prompting for voice dialing if said new voice tag is not the first voice tag to be successfully saved.

32. A wireless communication device, comprising:

means for receiving a voice tag corresponding to a first telephone number, said voice tag having a recoding quality, wherein the wireless communication device receives the voice tag;

means for comparing said recording quality to a quality parameter stored at the wireless communication device;

means for prompting a user of the wireless communication device to re-record said voice tag when said recording quality does not satisfy said quality parameter;

means for saving said voice tag at the wireless communication device;

means for checking whether said voice tag is a first voice tag to be saved at the wireless communication device, wherein said checking is performed by the wireless communication device; and means for informing said user of an option to use voice dialing if said voice tag is the first voice tag to be saved.

\* \* \* \* \*